No. 627,480.  
J. W. CARLETON.  
DRILL CHUCK.  
(Application filed Apr. 18, 1899.)

Patented June 27, 1899.

(No Model.)

Witnesses  
A. W. Stipek  
E. M. Hubert

Inventor  
John W. Carleton.  
By James Shepard.  
Atty.

THE NORRIS PETERS CO., PHOTO-LITHO., WASHINGTON, D. C.

UNITED STATES PATENT OFFICE.

JOHN W. CARLETON, OF NEW BRITAIN, CONNECTICUT, ASSIGNOR TO THE UNION MANUFACTURING COMPANY, OF SAME PLACE.

DRILL-CHUCK.

SPECIFICATION forming part of Letters Patent No. 627,480, dated June 27, 1899.

Application filed April 18, 1899. Serial No. 713,438. (No model.)

*To all whom it may concern:*

Be it known that I, JOHN W. CARLETON, a citizen of the United States, residing in New Britain, in the county of Hartford and State of Connecticut, have invented certain new and useful Improvements in Drill-Chucks, of which the following is a specification.

My invention relates to improvements in drill-chucks; and the object of my improvement is to provide simple and efficient means to prevent the drill from rotating within the chuck-jaws.

Figure 1:
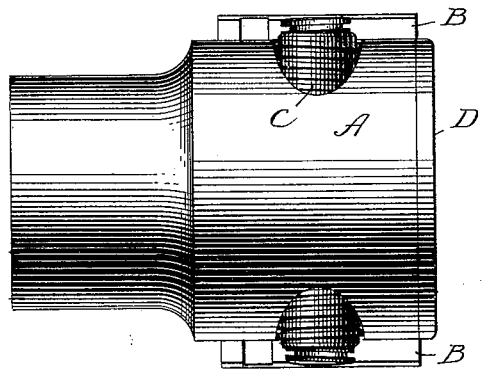
Figure 2:
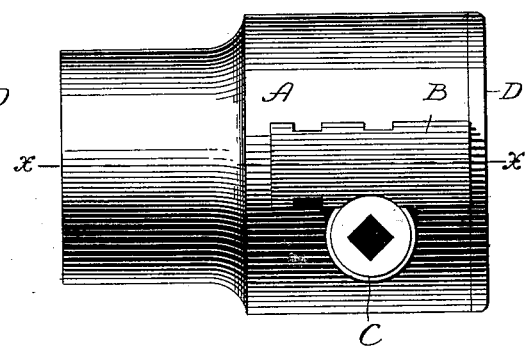
Figure 3:
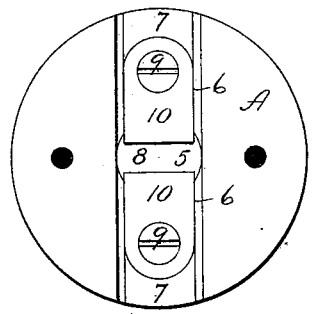
Figure 4:
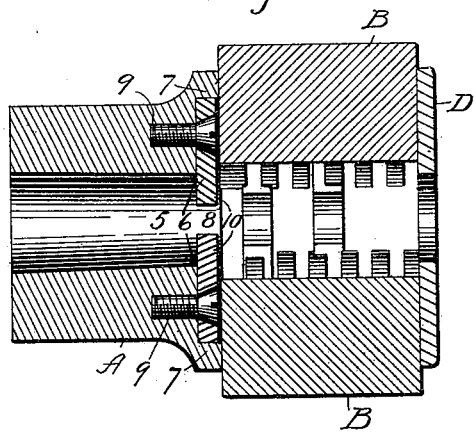

In the accompanying drawings, Figure 1 is a side elevation of my drill-chuck. Fig. 2 is a plan view of the same considered with reference to the position shown in Fig. 1. Fig. 3 is an end view with the cap-plate, the chuck-jaws, and jaw-operating screw removed; and Fig. 4 is a longitudinal section on the line $x$ $x$ of Fig. 1 of the complete chuck, two screws being shown in elevation.

A designates the head, transversely slotted; B B, the jaws within the transverse slot of said head; C, the right and left hand operating-screw for said jaws, and D the cap at the outer end of the head. These parts are or may be mainly of an ordinary construction.

The head is provided with a tapering hole or other suitable means for connecting it with a driving-center of a drill-lathe in the ordinary manner. At the bottom of the transverse slot within which the jaws are held I form diametrically opposite recesses 6 6, preferably with rounded walls 7 at their outer ends for convenience of forming or dressing said recesses with a sweep or milling-tool. In the bottom of these recesses I form threaded screw-holes, and within said recesses I secure, by means of screws 9, the two driving-plates 10, of hard metal, the outer ends of said plates resting against and supported by the end walls 7 of the recesses 6. The inner ends of these plates are separated from each other, so as to form a slot 8 at the base of the jaws B, which slot may receive a flattened lip on the end of the drill to positively drive the drill in case the grip of the jaws thereon is not sufficient to keep the drill from turning within said jaws.

I am aware that drills and drill-chucks with such a flattened lip and a driver at the base of the chuck-jaws to engage the said lip are not broadly new, and therefore I disclaim the same when the driver and its seats are of a substantially different construction from that herein shown and described.

I claim as my invention—

The combination of the chuck-head, jaws, and means for operating said jaws, with the driver-plates inserted within diametrically opposite recesses in the chuck-head with walls 7 at the outer ends of said recesses, against which walls the outer ends of the said driver-plates are seated, and the screws for securing said plates within said recesses of the said head, substantially as described.

JOHN W. CARLETON.

Witnesses:
JAMES SHEPARD,
A. W. STIPEK.